(12) United States Patent
James et al.

(10) Patent No.: US 12,304,636 B2
(45) Date of Patent: May 20, 2025

(54) AIRCRAFT PASSENGER SEAT UNIT

(71) Applicant: Safran Seats GB Limited, Cwmbran (GB)

(72) Inventors: Rachel James, Cwmbran (GB); Jurre Miedema, Cwmbran (GB); James Woodington, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 557 days.

(21) Appl. No.: 17/285,883

(22) PCT Filed: Oct. 14, 2019

(86) PCT No.: PCT/GB2019/052912
§ 371 (c)(1),
(2) Date: Apr. 15, 2021

(87) PCT Pub. No.: WO2020/079405
PCT Pub. Date: Apr. 23, 2020

(65) Prior Publication Data
US 2021/0347484 A1     Nov. 11, 2021

(30) Foreign Application Priority Data

Oct. 15, 2018   (GB) ..................................... 1816737

(51) Int. Cl.
*B64D 11/06*          (2006.01)
(52) U.S. Cl.
CPC ...... *B64D 11/0606* (2014.12); *B64D 11/0602* (2014.12); *B64D 11/0627* (2014.12)
(58) Field of Classification Search
CPC .............. B64D 11/0023; B64D 11/003; B64D 11/0606; B64D 11/0627; B64D 11/06
(Continued)

(56) References Cited

U.S. PATENT DOCUMENTS

| 4,134,233 A | 1/1979 | Gutridge et al. |
| 5,024,398 A * | 6/1991 | Riedinger .......... B64D 11/0605 244/118.5 |

(Continued)

FOREIGN PATENT DOCUMENTS

| CN | 104487344 A | 4/2015 |
| CN | 107949520 A | 4/2018 |

(Continued)

OTHER PUBLICATIONS

International Patent Application No. PCT/GB2019/052912, International Search Report and Written Opinion, dated Jan. 31, 2020.

(Continued)

*Primary Examiner* — Joshua J Michener
*Assistant Examiner* — Ryan Andrew Yankey
(74) *Attorney, Agent, or Firm* — Kilpatrick Townsend & Stockton LLP

(57)            ABSTRACT

The present invention provides an aircraft passenger seat unit comprising a seat, a privacy shell having a primary opening to allow entry to and exit from the seat unit, a storage unit comprising one or more holders for supporting clothes and a door movable between a first position in which the door at least partially blocks off the primary opening, and a second position in which the door at least partially closes access to holders of the storage unit. The invention also provides an aircraft passenger seat unit in which the door fully blocks off the primary opening, so that passenger entry and exit is prevented, in the first position. The invention also provides an aircraft passenger seat unit in which the door is arranged to move in a direction offset from an angle of the privacy shell adjacent the opening.

3 Claims, 4 Drawing Sheets

(58) Field of Classification Search
USPC .............................................. 49/70; 312/295
See application file for complete search history.

(56) References Cited

U.S. PATENT DOCUMENTS

| | | | | |
|---|---|---|---|---|
| 7,934,679 | B2* | 5/2011 | Bock ................. | B64D 11/0638 244/118.6 |
| 12,043,389 | B2* | 7/2024 | Wills ..................... | E05C 19/04 |
| 2011/0210205 | A1 | 9/2011 | Bock et al. | |
| 2013/0241247 | A1* | 9/2013 | Wallace ............. | B64D 11/0604 297/118 |
| 2013/0248655 | A1* | 9/2013 | Kroll ................. | B64D 11/0604 244/118.6 |
| 2014/0077033 | A1* | 3/2014 | Scown ................. | B64D 11/02 49/70 |
| 2015/0360783 | A1* | 12/2015 | Cailleteau ............. | B64D 11/06 244/118.6 |
| 2016/0059966 | A1 | 3/2016 | Dryburgh et al. | |
| 2017/0029118 | A1 | 2/2017 | Ehrmann et al. | |
| 2017/0283064 | A1 | 10/2017 | Robinson | |
| 2018/0281963 | A1* | 10/2018 | Dowty ............... | B64D 11/0606 |
| 2022/0242572 | A1* | 8/2022 | Layet ................ | B64D 11/0606 |

FOREIGN PATENT DOCUMENTS

| | | |
|---|---|---|
| GB | 2563150 A | 12/2018 |
| WO | 2018093825 A1 | 5/2018 |

OTHER PUBLICATIONS

United Kingdom Patent Application No. GB1816737.9, Search Report, dated Oct. 9, 2019.
United Kingdom Patent Application No. GB1816737.9, Search Report, dated Oct. 10, 2019.
United Kingdom Patent Application No. GB1816737.9, Search Report, dated Mar. 29, 2019.
Swiss International Air Lines, 'Swiss First', swiss.com, [online], Available from: https://www.swiss.com/worldofswiss/en/story/swiss-first.
China Patent Application 2019800678646, Search Report, dated Dec. 26, 2022.

* cited by examiner

AIRCRAFT PASSENGER SEAT UNIT

CROSS-REFERENCE TO RELATED APPLICATIONS

This application is a national stage application of International Patent Application PCT/GB2019/052912, filed on Oct. 14, 2019, which claims priority to United Kingdom Patent Application No. 1816737.9, filed on Oct. 15, 2018, both of which are hereby incorporated by reference in their entireties.

FIELD OF THE INVENTION

The present invention concerns an aircraft passenger seat unit. More particularly, but not exclusively, this invention concerns an aircraft passenger seat unit comprising a seat, a privacy shell at least partially surrounding the seat, the privacy shell having a primary opening to allow entry to and exit from the seat unit and a storage unit comprising one or more holders for supporting clothes stored in the storage unit, and being located against an interior face of the privacy shell adjacent the primary opening.

BACKGROUND OF THE INVENTION

Aircraft passenger seat units, or suites, often found in business and particularly first class aircraft cabins, are expected to provide a passenger with a relatively high level of privacy, for example provided by a privacy shell. For example, a first class passenger often expects to be able to close off fully an area around them (within the suite) so that airline crew and/or other passengers cannot see in to the suite and/or cannot access the suite without moving a door. In addition, a first class passenger will often expect a wardrobe, or other storage unit, within the suite. The wardrobe tends to have a separate door. This adds to the weight and complexity of the suite.

A Swiss Air First Class arrangement uses the width of the privacy shell to provide wardrobe space. When the wardrobe is open, it is pulled out from the privacy shell to close off a doorway of the shell and to allow access to the contents of the wardrobe. When it is closed, it is slid into the privacy shell. This also then provides access through the doorway and closes off access to the wardrobe contents.

A problem with this arrangement is that to open up the suite to allow doorway access involves moving the entire wardrobe and its contents. This means that it could be heavy and more difficult to move and may require a more robust mounting arrangement, making the arrangement heavier. In addition, moving of the clothes each time the access door is to be moved may cause damage to the clothes. Further, the wardrobe is not readily accessible. Finally, it is noted that when the wardrobe is open (and the doorway closed) the clothes in the wardrobe are adjacent the seat/bed of the suite and so this may additionally cause damage to the clothes.

The Swiss Air First Class arrangement also uses a second panel to close off the suite. This panel is next to the wardrobe (when open) and effectively forms part of the privacy shell. The panel can be stowed by sliding to open up that part of the privacy shell and allow an emergency opening out of the suite. This may be used, for example, if the wardrobe were to become jammed in its open (doorway closed) position. Again, having a second moveable panel (or door) adds to the weight and complexity of the suite.

The Swiss Air First Class arrangement has a seat, privacy screen and wardrobe that are all substantially parallel to each other. This can mean that the suite feels crowded.

The present invention seeks to mitigate the above-mentioned problems. Alternatively or additionally, the present invention seeks to provide an improved aircraft passenger seat unit.

SUMMARY OF THE INVENTION

The present invention provides, according to a first aspect, an aircraft passenger seat unit comprising a seat, a privacy shell at least partially surrounding the seat, the privacy shell having a primary opening to allow entry to and exit from the seat unit, a storage unit comprising one or more holders for supporting clothes stored in the storage unit, and being located against an interior face of the privacy shell adjacent the primary opening, a door, movable in relation to the storage unit between a first position in which the door at least partially blocks off the primary opening, and a second position in which the door at least partially closes access to holders of the storage unit.

Having the door moveable in relation to the holders of the storage unit enables the door to be moved without also moving the contents of the storage unit being supported by the holders. This means that the contents are less likely to be damaged during door movement. In addition, the arrangement is easier to move as only the weight of the door is being moved. The mounting of the door may also be light as it only needs to support a relatively low weight door. In addition, the holders of the storage unit are readily accessible and simply require the door to be moved towards the first position. Finally, it is noted that the storage unit is located adjacent the opening (i.e. next to it). Hence, when the storage unit is accessible, the contents of the storage unit are located to one side of the opening, and if the opening is central in the seat unit, as is often the case, this means that the contents are located to one side of the seat unit. This further prevents damage to the contents, as they are not adjacent the seat/bed of the seat unit.

The door may be arranged such that, in the first position, the door at least partially provides access to the holders of the storage unit and, in the second position, the door is located to provide at least partial access to the primary opening. The door may be arranged such that, in the second position, the door only at least partially closes access to holders of the storage unit.

The door in the first position may fully block off the primary opening. For example, such that passenger entry and exit (to/from the seat unit) is prevented. Alternatively, the door in the first position may only partially block off the primary opening. A further door or panel may be used to fully block off the primary opening.

The door may comprise a moveable or removable portion. Moving or removal of the portion may provide a user with a secondary opening to allow an emergency exit from the seat unit when the door is in the first position.

Having a removable portion allows for an emergency opening without providing a further moveable (for example, slidable) panel or door. It is noted that in the first position, it is only the door (and no contents of the storage unit, for example) that black off the primary opening.

The removable portion may be frangible, such that the removable portion can be broken from the rest of the door to provide the secondary opening.

Alternatively, the door may comprises a moveable secondary door portion. The secondary door portion may be slidable or pivotable in relation to the door.

The storage unit may be fixed in relation to the privacy shell. It will be understood that the storage unit may be fixed directly to the privacy shell or indirectly, for example via a floor of the aircraft passenger seat unit. Thus, the contents of the storage unit are not moved excessively.

The holders of the storage unit may be located at least 20 cm above a floor of the aircraft passenger seat unit. Preferably, the holders may be located at least 50 cm above the floor. More preferably, the holders may be located at least 100 cm above the floor. Even more preferably, the holders may be located at least 150 cm above the floor. The storage unit may be a wardrobe. The one or more holders of the storage unit may comprise a number of a hooks, shelves, and/or rails.

The door may be arranged to slide between the first position and the second position. The door may slide in a direction substantially along its length. Alternatively, the door may be a folding door, such as a concertina door.

A back side of the storage unit may be located against the interior face of the privacy shell. A front side of the storage unit may provide access to the holders of the storage unit when the door is in the second position.

It is noted that the statement that the back side of the storage unit may be located against the interior face of the privacy shell does not require that the back side abuts directly against the interior face. For example, there may be a gap between the back side of the storage unit and the interior face of the privacy shell.

A depth of the storage unit between the front side and the back side may be deeper at a first end of the storage unit than at a second end of the storage unit. It may be that the front side of the storage unit is at an angle offset from the back side of the storage unit, such that the front and back sides of the storage unit are not parallel. The front side of the storage unit may be offset by an angle between 1° and 30°. Preferably, the angle may be between 15° and 25°.

The first end of the storage unit may be distal from the primary opening. The second end of the storage unit may be proximate the opening. This allows for the storage unit to sit further away from the privacy screen at its end distal from the primary opening. This may thus reduce the space available for the feet of the passenger, which generally require less space than a torso region of the passenger. At the same time, a larger storage unit can be provided.

The door may be arranged to move between the first position and the second position in a direction offset from an angle of the interior face of the privacy shell. The direction of movement of the door may be offset by an angle between 1° and 30°. Preferably, the angle may be between 15° and 25°.

The orientation of the door may change between the two positions such that it is angled relative to the privacy shell in the second position and is aligned with the privacy shell in the first position.

It may be that an angle faced by the seat is offset from direction of movement of the door. The direction of movement of the door may be offset by an angle between 1° and 25°. Preferably, the angle may be between 4° and 12°. It may be that an angle faced by the seat is offset from the angle of the interior face of the privacy shell. The direction of seat may be offset by an angle between 1° and 45°. Preferably, the angle may be between 8° and 20°.

The privacy shell may extend to a height of at least 100 cm a floor of the aircraft passenger seat unit. Preferably, the privacy shell may extend to a height of at least 125 cm above the floor. More preferably, the privacy shell may extend to a height of at least 150 cm above the floor. Even more preferably, the privacy shell extends to a ceiling of an aircraft cabin.

According to a second aspect of the invention there is also provided an aircraft passenger seat unit comprising a seat, a privacy shell at least partially surrounding the seat, the privacy shell having a primary opening to allow entry to and exit from the seat unit, and a door, moveable in relation to the primary opening from a first position in which the door fully blocks off the primary opening, so that passenger entry and exit (to/from the seat unit) is prevented, and a second position in which the door provides at least partial access to the primary opening.

Passenger entry and exit may be achieved (solely) through the primary opening.

Having the door fully block off the primary opening in the first position means that no further panel or door is needed to fully block off the opening. This provides suitable privacy without the weight and complexity of a further moveable panel (or door).

In the second position, the door may provide full access to the primary opening.

The door may comprise a moveable or removable portion. Moving or removal of the portion may provide a user with a secondary opening to allow an emergency exit from the seat unit when the door is in the first position.

Having a removable portion allows for an emergency opening without providing a further moveable (for example, slidable) panel or door. It is noted that in the first position, it is only the door (and no contents of the storage unit, for example) that black off the primary opening.

The removable portion may be frangible, such that the removable portion can be broken from the rest of the door to provide the secondary opening.

Alternatively, the door may comprises a moveable secondary door portion. The secondary door portion may be slidable or pivotable in relation to the door.

The door may be arranged to slide between the first position and the second position. The door may slide in a direction substantially along its length. Alternatively, the door may be a folding door, such as a concertina door.

The privacy shell may extend to a height of at least 100 cm a floor of the aircraft passenger seat unit. Preferably, the privacy shell may extend to a height of at least 125 cm above the floor. More preferably, the privacy shell may extend to a height of at least 150 cm above the floor. Even more preferably, the privacy shell extends to a ceiling of an aircraft cabin.

According to a third aspect of the invention there is also provided an aircraft passenger seat unit comprising a seat, a privacy shell at least partially surrounding the seat, the privacy shell having a primary opening to allow entry to and exit from the seat unit and a door, movable between a first position in which the door at least partially blocks off the primary opening, and a second position, in which the door provides at least partial access to the primary opening, wherein the door is arranged to move between the first and second positions in a direction offset from an angle of the privacy shell adjacent the opening.

Having the door arranged to move between the first and second positions in a direction offset from an angle of the privacy shell adjacent the opening, allows for a much more spacious feel in the set unit. For example, it is easier to provide a suitable seat/bed space whilst also providing suitable storage.

The door may be arranged to move between the first position and the second position in a direction offset from an angle of the interior face of the privacy shell. The direction of movement of the door may be offset by an angle between 1° and 30°. Preferably, the angle may be between 15° and 25°.

It may be that an angle faced by the seat is offset from direction of movement of the door. The direction of movement of the door may be offset by an angle between 1° and 25°. Preferably, the angle may be between 4° and 12° It may be that an angle faced by the seat is offset from the angle of the interior face of the privacy shell. The direction of seat may be offset by an angle between 1° and 45°. Preferably, the angle may be between 8° and 20°.

The door may be located further away from a side of the seat unit providing the opening when in the first position than it is when in the second position. This allows for the storage unit to sit further away from the privacy screen at its end distal from the primary opening. This may thus reduce the space available for the feet of the passenger, which generally require less space than a torso region of the passenger. At the same time, a larger storage unit can be provided.

The door may be arranged to slide between the first position and the second position. The door may slide in a direction substantially along its length. Alternatively, the door may be a folding door, such as a concertina door.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
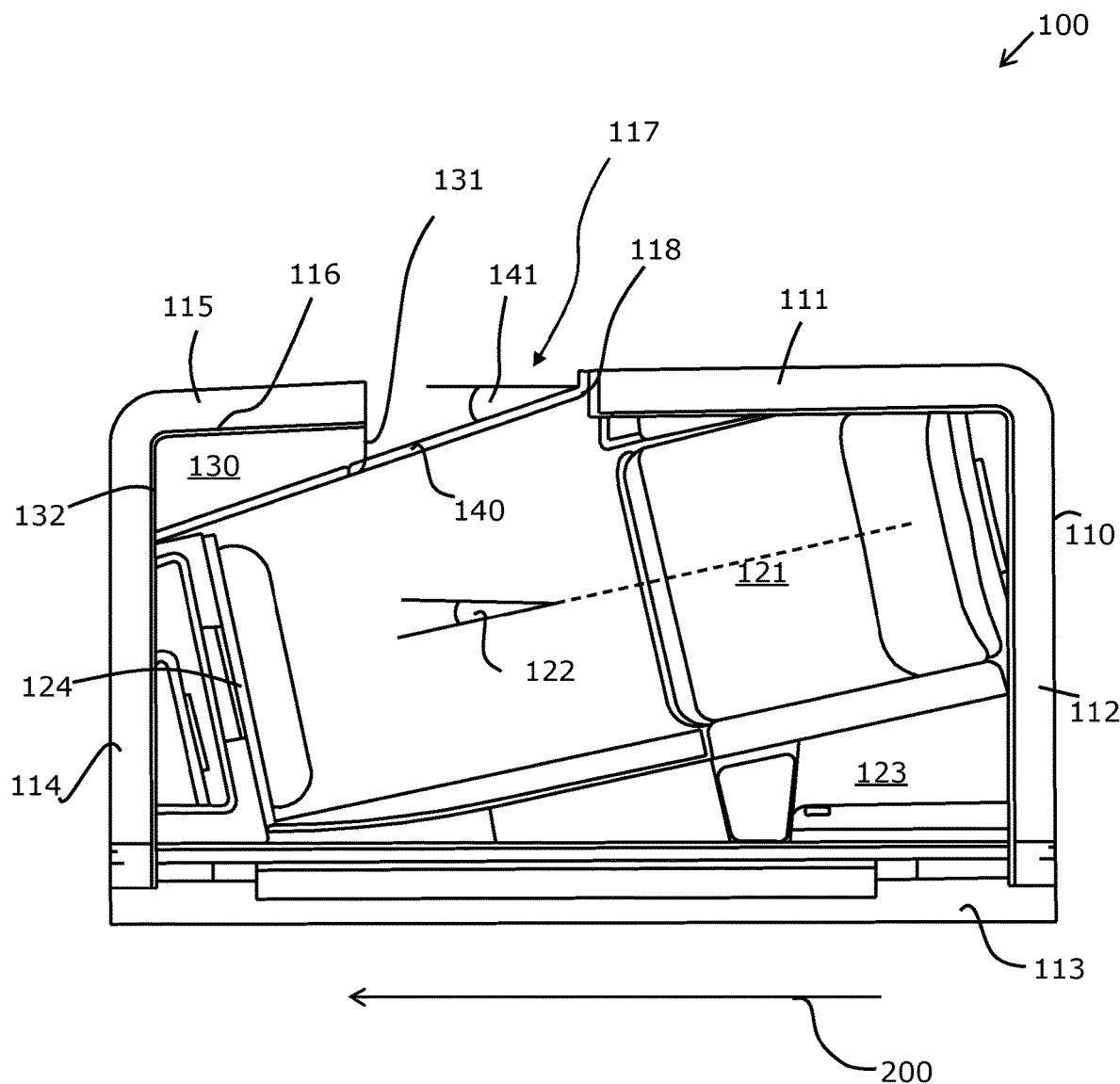
FIG. 1 shows a plan view of an aircraft passenger seat unit according to a first embodiment of the invention.

FIG. 1 shows a plan view of an aircraft passenger seat unit 100 according to a first embodiment of the invention. The unit 100 is also known as a suite. The suite 100 contains a seat 121. The seat 121 is configurable, in a conventional manner, such that it can be converted into a lie-flat bed for a passenger of the suite 100.

The seat 121 is surrounded by a privacy shell 110, the privacy shell acting as a boundary to and of the suite 100. The privacy shell 110 provides a rectangular shape to the unit 100. The privacy shell 110 is made up of various walls, as will now be described.

A first wall 111 extends parallel to a longitudinal direction 200 of an aircraft cabin in which the unit 100 is situated, and is located to one side (right side, for the embodiment shown) of the seat 121. This first wall 111 is adjacent to, and extends along one side of, an aisle (not shown) of the aircraft cabin. A second wall 112 extends substantially perpendicular to the first wall 111 (away from the aisle) and extends behind the seat 121, a third wall 113 extends parallel to the first wall 111 (on an opposite side of the seat 121) and extends the length of the unit 100 to an end of the unit 100 opposite the seat 121. A fourth wall 114 extends perpendicular to the first 111 and third 113 walls and parallel and opposite to the second wall 112 so that it is opposite the seat 121. The fourth 114 and second 112 walls are substantially the same length as each other. A fifth wall 115 extends parallel to the first 111 and third 113 walls and also extends in the same plane as the first wall 111 (along the side of the aisle) so as to be part of the same side of the rectangle shape of the unit 100 as the first wall 111.

In between the first wall 111 and the fifth wall 115 is an access opening 117. This opening 117 allows access of a passenger to/from the unit 100.

As can be seen in FIG. 1, the seat 121 faces forwards at an angle 122 to the longitudinal direction 200 of the aircraft cabin. This angle 122 is 12 degrees.

Also contained within the unit or suite 100 is a storage unit 123. This storage unit 123 is located to the left (for the embodiment shown) of the seat 121 and occupies the space in between the seat 121 and the third wall 113. It can be seen that, as the seat 121 is at the angle 122 to the third wall 113, the storage unit is triangular-shaped in plan view. Below the storage unit 123 (i.e. further into the page of FIG. 1) is a footwell provided for use by a passenger in a seat behind (not shown) seat 121. Similarly, a passenger in seat 121 may be able to use a footwell in a similar seat unit (not shown) in front. This may be achieved by there being an appropriate opening or hole (not shown) in fourth wall 114.

The unit 100 also comprises a monitor screen 124 located adjacent to the fourth wall 114. The screen 124 is placed at an angle so as to be perpendicular to the direction the seat 121 faces (to provide a suitable viewing angle for the passenger in the seat 121). Hence, the screen 124 is angled to the fourth wall 114.

The unit 100 also contains a wardrobe 130. This wardrobe 130 is located at the corner of the fourth wall 114 and the fifth wall 115, and abuts against an interior side of the fourth wall and an interior side 116 of the fifth wall. A back wall of the wardrobe abuts against the interior 116 of the fifth wall 115 and extends to the opening 117. A left side wall 132 abuts against the interior of the fourth wall 114. A front side of the wardrobe extends at angle 141 of 19 degrees from the fourth wall 114 towards the opening 117. A right side wall 131 of the wardrobe extends from the back wall (at the end of the fifth wall adjacent the opening 117) perpendicular to the fifth wall 115, to meet the front side.

Hence, the wardrobe has the shape of a "rectangle plus triangle" in plan form. In other words, a rectangular rear portion of the wardrobe 130 abuts against the fifth wall 115 and a front triangular portion of the wardrobe 130 is in front of the rectangular portion. The depth of the wardrobe at the left side wall 132 is deeper than at the right side wall 131.

The wardrobe is provided with a door 140. The door 140 is slidable. The door 140 slides in a direction parallel to the front of the wardrobe (i.e. at angle 141 to the longitudinal direction 200 of the aircraft cabin).

A first extreme position of the door 140 is a "closed wardrobe" position, where it is located adjacent to, and parallel to, the front side of the wardrobe 130. In this position, a left edge of the door abuts against the fourth wall 114 and a right edge of the door lies flush with the right wall 131 of the wardrobe 130. This position can be clearly seen in FIG. 2a.

A second extreme position of the door 140 is an "open wardrobe" position, where the door 140 is located to the side of the front side of the wardrobe 130. In this position, the right edge of the door abuts against an inside edge 118 of the first wall 111 and the left edge of the door is located adjacent the right side wall 131 of the wardrobe 130. This position can be clearly seen in FIG. 2b.

Figure 2A:
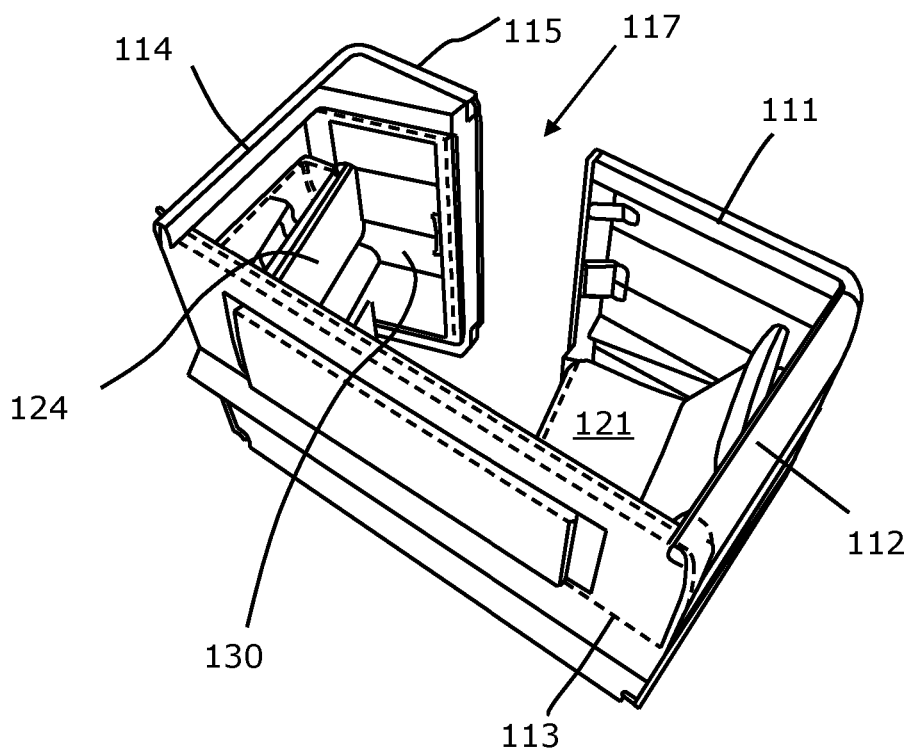
FIG. 2a shows a perspective view of the aircraft passenger seat unit of FIG. 1, with the wardrobe in its closed configuration.
Figure 2B:
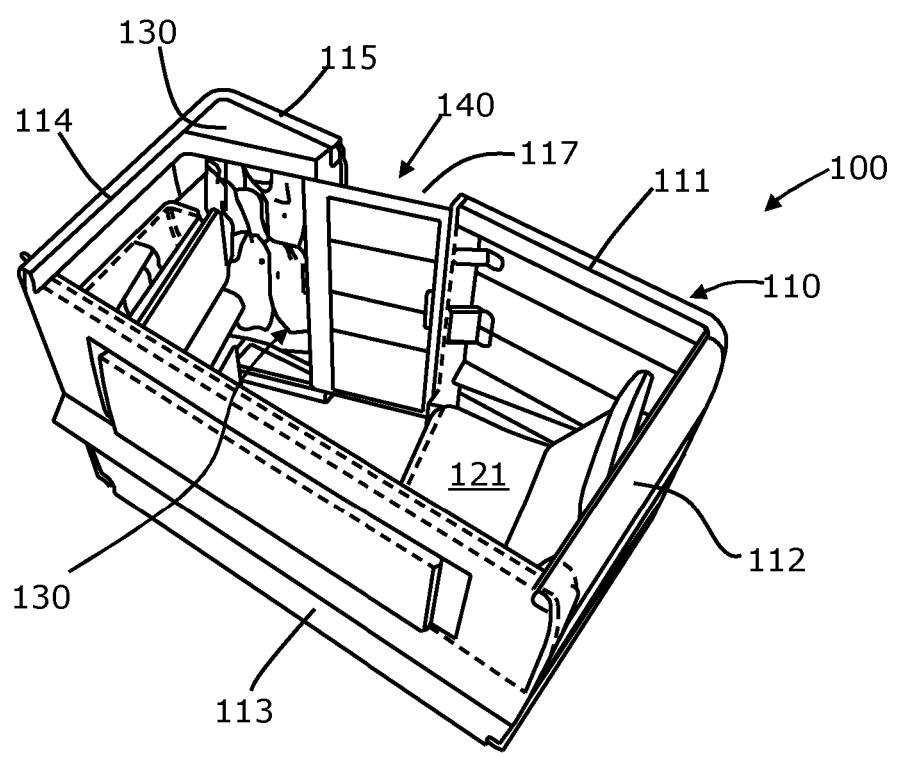
FIG. 2b shows a perspective view of the aircraft passenger seat unit of FIG. 1, with the wardrobe in its open configuration.
Figure 4:
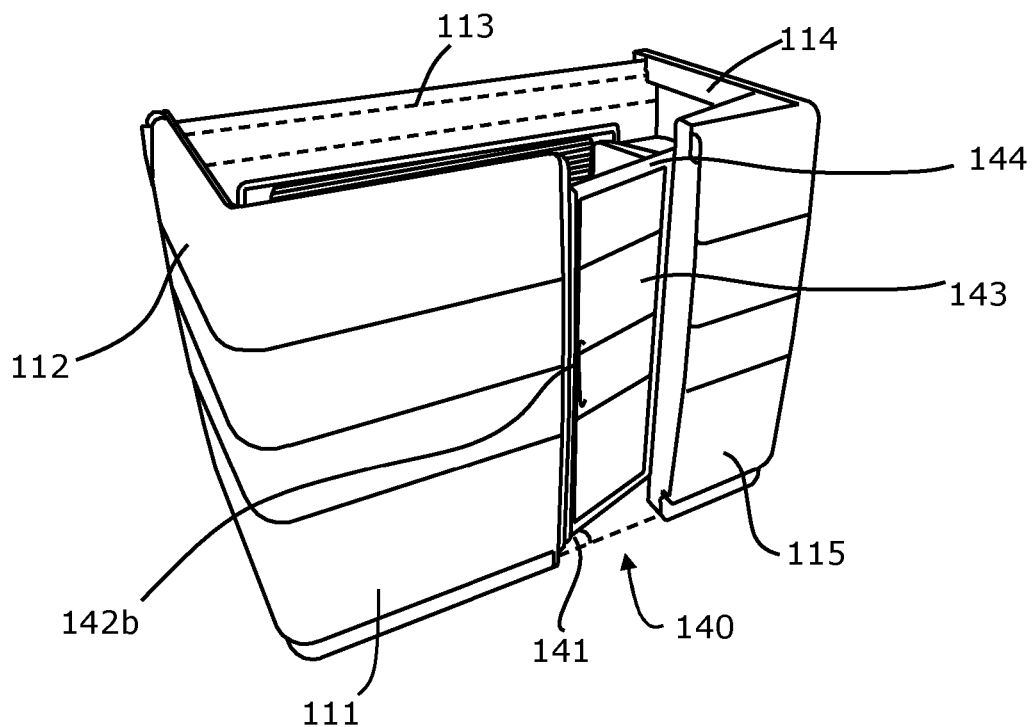
FIG. 4 shows a perspective view of the outside of the aircraft passenger seat unit of FIG. 1, with access to/from the unit closed off.

Importantly, when the door 140 is in the "closed wardrobe" position, such as in FIG. 2a, the opening 117 is accessible and so there is easy access into and out of the unit 100. When the door 140 is in the "open wardrobe" position, such as in FIG. 2b, the opening 117 is blocked off by the door 140 such that there is no easy access into and out of the unit 100. FIG. 4 shows a perspective view of the outside of the aircraft passenger seat unit 100, with access to/from the unit closed off by the door 140 in the "open wardrobe" position.

Figure 3:
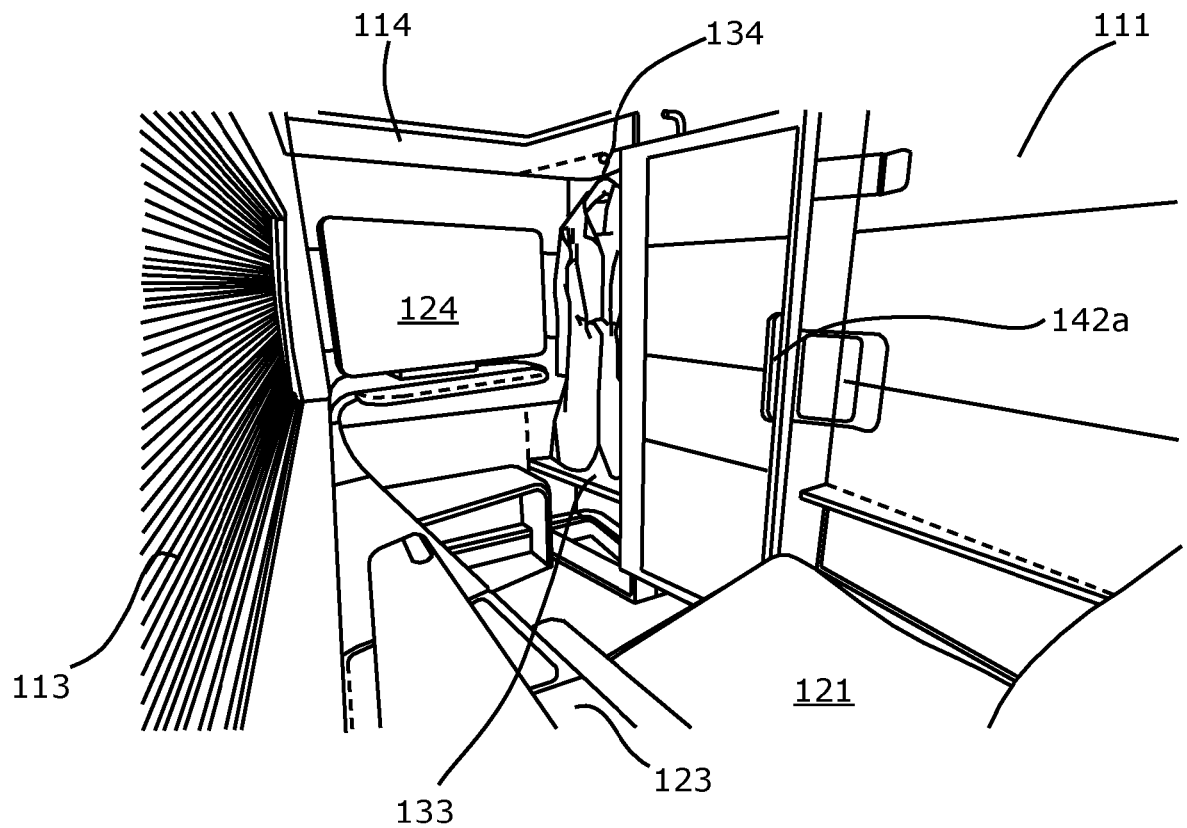
FIG. 3 shows a view of the wardrobe of the aircraft passenger seat unit of FIG. 1, from within the unit.

FIG. 3 shows a view of the wardrobe 130 from within the unit 100. Here, it can be seen that the wardrobe provides a lower shelf 133 at a height of 43 cm above an aircraft cabin floor. At the top of the wardrobe 130, there is a hook 134 upon which a coat hanger and coat can be hung. The hook is at a height of 150 cm above the aircraft floor. The door extends from the floor to a height of 147 cm above the floor.

As can be seen in FIG. 3, the inner side of the door 140 of the wardrobe has an elongated vertical handle notch 142a (approximately at a half height of the door 140) that a passenger can use to grip to move the door between the two extreme positions, from inside the unit 100. There is a similar elongated vertical handle notch 142b on the outer side of the door 140 that a user, such as an airline crew member, can use to grip to move the door between the two extreme positions, from outside the unit 100.

Figure 5:
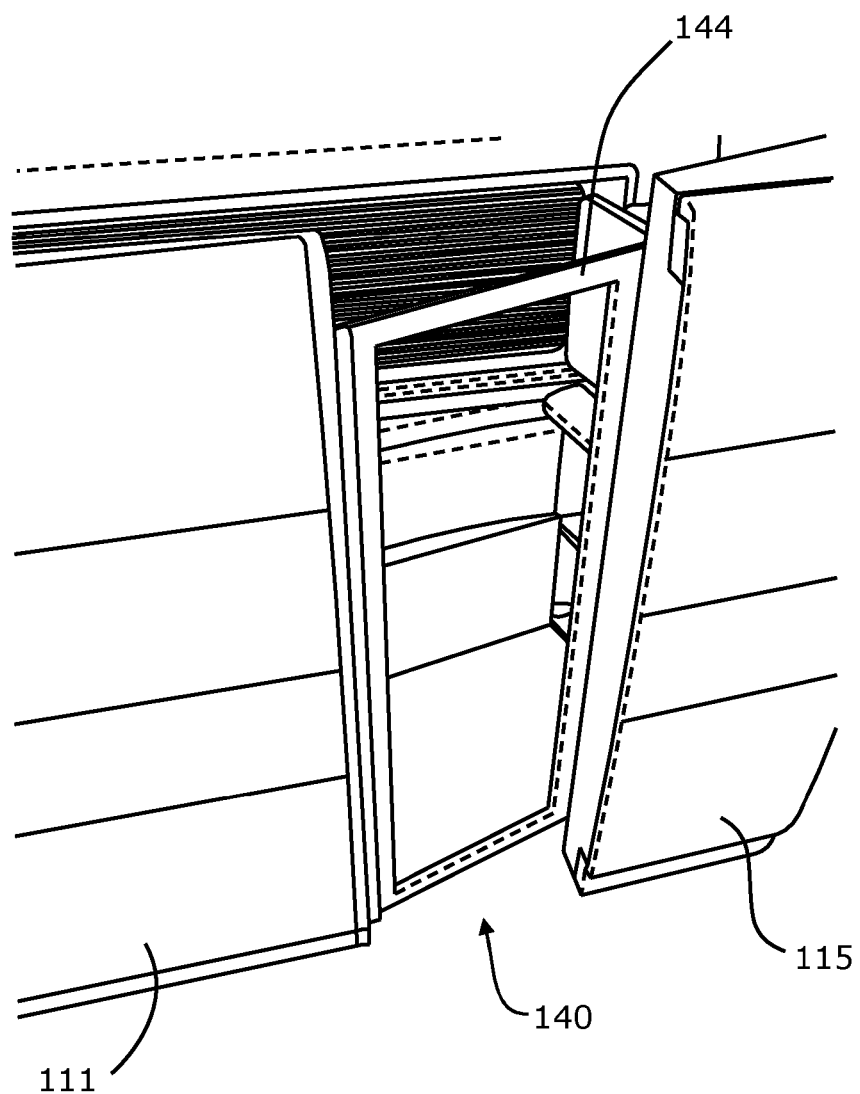
FIG. 5 shows a perspective view of the outside of the aircraft passenger seat unit of FIG. 1, with emergency access to/from the unit being provided.

The door 140 comprises a frame 144 that forms a perimeter section of the door 140. The frame 143 provides the structural strength of the door 140 and the elongated handle notches 142a, 142b are located on the frame 144. Within/inside the frame 144, the door 140 comprises a frangible panel 143 that be broken and separated from the frame 144. FIG. 5 shows a perspective view of the outside of the aircraft passenger seat unit 100, with the panel 143 removed so as to provide emergency access to/from the unit 100. Here, a secondary opening is provided through the frame 144 of the door 140.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The wardrobe 130 may be provided with any suitable number and height of hooks 134 and shelves 133. In addition, or instead, the wardrobe 130 may be provided with a number of rails. In fact, the wardrobe may be provided with any suitable clothes holder/storage features.

The storage unit 123 may be a deep storage unit so that the relevant plan area is only used for storage. There may be no footwell for use with a seat behind. Similarly, there may be no forwards footwell (in a seat unit in front) for use by the passenger of seat 121.

The orientation of the door may change between the two positions such that it is angled relative to the privacy shell in the second position and is aligned with the privacy shell in the first position. This may be achieved by running the door on tracks, which are linear along the storage unit across the primary opening, and then by splitting the tracks at a point where the primary opening and the storage unit meet.

These secondary tracks may be curved and they are engaged when the door is approaching the first position. The tracks at the far end away from the storage unit may also be slightly curved. Upon movement of the door from the second position to the first position, the door is substantially pivoting around a point away from the storage unit or it is pivoting and tracking at said point away from the storage unit.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft passenger seat unit comprising:
   a seat;
   a privacy shell at least partially surrounding the seat, the privacy shell being made up of a plurality of walls, including two parallel walls extending in the same plane, and having a primary opening between the two parallel walls to allow entry to and exit from the seat unit; and
   a door, movable between a first position in which the door at least partially blocks off the primary opening, and a second position, in which the door provides at least partial access to the primary opening, wherein the door is arranged to move between the first and second positions in a direction offset by an angle from the two parallel walls of the privacy shell,
   wherein the door is arranged to slide between the first position and the second position in a direction along a length of the door, and
   wherein the door is angled relative to the two parallel walls of the privacy shell in the second position.

2. The aircraft passenger seat unit according to claim 1, wherein the movement direction of the door is offset from the first edge of the primary opening of the privacy shell by an angle between 1° and 30°.

3. The aircraft passenger seat unit according to claim 1, the door is located further away from a side of the seat unit providing the opening when in the first position than it is when in the second position.

* * * * *